(12) United States Patent
Murphy (10) Patent No.: US 11,458,821 B1
(45) Date of Patent: Oct. 4, 2022

(54) RACK MOUNTED WEATHER SHIELD

(71) Applicant: David Murphy, Basking Ridge, NJ (US)

(72) Inventor: David Murphy, Basking Ridge, NJ (US)

(*) Notice: Subject to any disclaimer, the term of this patent is extended or adjusted under 35 U.S.C. 154(b) by 876 days.

(21) Appl. No.: 16/299,240

(22) Filed: Mar. 12, 2019

(51) Int. Cl.
*B60J 5/04* (2006.01)

(52) U.S. Cl.
CPC .................. *B60J 5/0494* (2013.01)

(58) Field of Classification Search
CPC .... B60J 5/0494; B60J 7/08; B60J 5/04; A45B 2023/0025
USPC ........................ 160/84.02; 296/99.1, 152, 163
See application file for complete search history.

(56) References Cited

U.S. PATENT DOCUMENTS

| | | | |
|---|---|---|---|
| D263,984 S | 4/1982 | Moss | |
| 4,848,827 A | 7/1989 | Ou | |
| 6,782,904 B2 | 8/2004 | Tien | |
| 7,641,259 B2* | 1/2010 | Teshima | B60J 5/0494 160/DIG. 4 |
| 8,079,629 B2 | 12/2011 | Raynor | |
| 8,240,323 B2* | 8/2012 | Lee | B60R 11/00 160/63 |
| 8,366,172 B1 | 2/2013 | Morazan | |
| 8,662,563 B1 | 3/2014 | Hardenbrook | |
| 9,090,153 B1* | 7/2015 | Boyd | B60J 11/06 |
| 9,403,426 B1* | 8/2016 | Boyd | B60J 5/0494 |
| 10,005,403 B2* | 6/2018 | Calvin | B60J 7/106 |

FOREIGN PATENT DOCUMENTS

| | | | |
|---|---|---|---|
| CN | 107757318 A | * | 3/2018 |
| EP | 0001422101 | | 5/2004 |
| KR | 2011010159 A | * | 2/2011 |

* cited by examiner

*Primary Examiner* — Joseph D. Pape
*Assistant Examiner* — Veronica M Shull
(74) *Attorney, Agent, or Firm* — Kyle A. Fletcher, Esq.

(57) ABSTRACT

The rack mounted weather shield is an awning. The rack mounted weather shield is configured for use with an automobile. The rack mounted weather shield attaches to a cargo rack. The rack mounted weather shield creates a weather protected space along a side of the automobile. The rack mounted weather shield is used for entering and exiting the automobile in inclement weather. The rack mounted weather shield extends and retracts. The rack mounted weather shield comprises a plurality of fans, a plurality of control circuits, and a remote control. Each of the plurality of fans creates the weather protected space on a side of the automobile. Each of the plurality of control circuits extends and retracts an individual fan selected from the plurality of fans. The remote control is a radio frequency device that controls the operation of the plurality of control circuits.

19 Claims, 6 Drawing Sheets

RACK MOUNTED WEATHER SHIELD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including non-fixed roofs, more specifically, a non-fixed roof panel.

SUMMARY OF INVENTION

The rack mounted weather shield is an awning. The rack mounted weather shield is configured for use with an automobile. The automobile further comprises a roof panel, a port side, and a starboard side. The automobile is further defined with a primary sense of direction. The roof panel further comprises a port cargo rack and a starboard cargo rack. The rack mounted weather shield attaches to a cargo rack selected from the group consisting of the port cargo rack and the starboard cargo rack. The rack mounted weather shield creates a weather protected space along a side of the automobile selected from the group consisting of the port side and the starboard side. The rack mounted weather shield is used for entering and exiting the automobile in inclement weather. The rack mounted weather shield extends for use and retracts for storage. The rack mounted weather shield comprises a plurality of fans, a plurality of control circuits, and a remote control. Each of the plurality of fans creates the weather protected space on a side of the automobile selected from the group consisting of the port side and the starboard side. Each of the plurality of control circuits extends and retracts an individual fan selected from the plurality of fans. The remote control is a radio frequency device that controls the operation of the plurality of control circuits.

These together with additional objects, features and advantages of the rack mounted weather shield will be readily apparent to those of ordinary skill in the art upon reading the following detailed description of the presently preferred, but nonetheless illustrative, embodiments when taken in conjunction with the accompanying drawings.

In this respect, before explaining the current embodiments of the rack mounted weather shield in detail, it is to be understood that the rack mounted weather shield is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rack mounted weather shield.

It is therefore important that the claims be regarded as including such equivalent construction insofar as they do not depart from the spirit and scope of the rack mounted weather shield. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
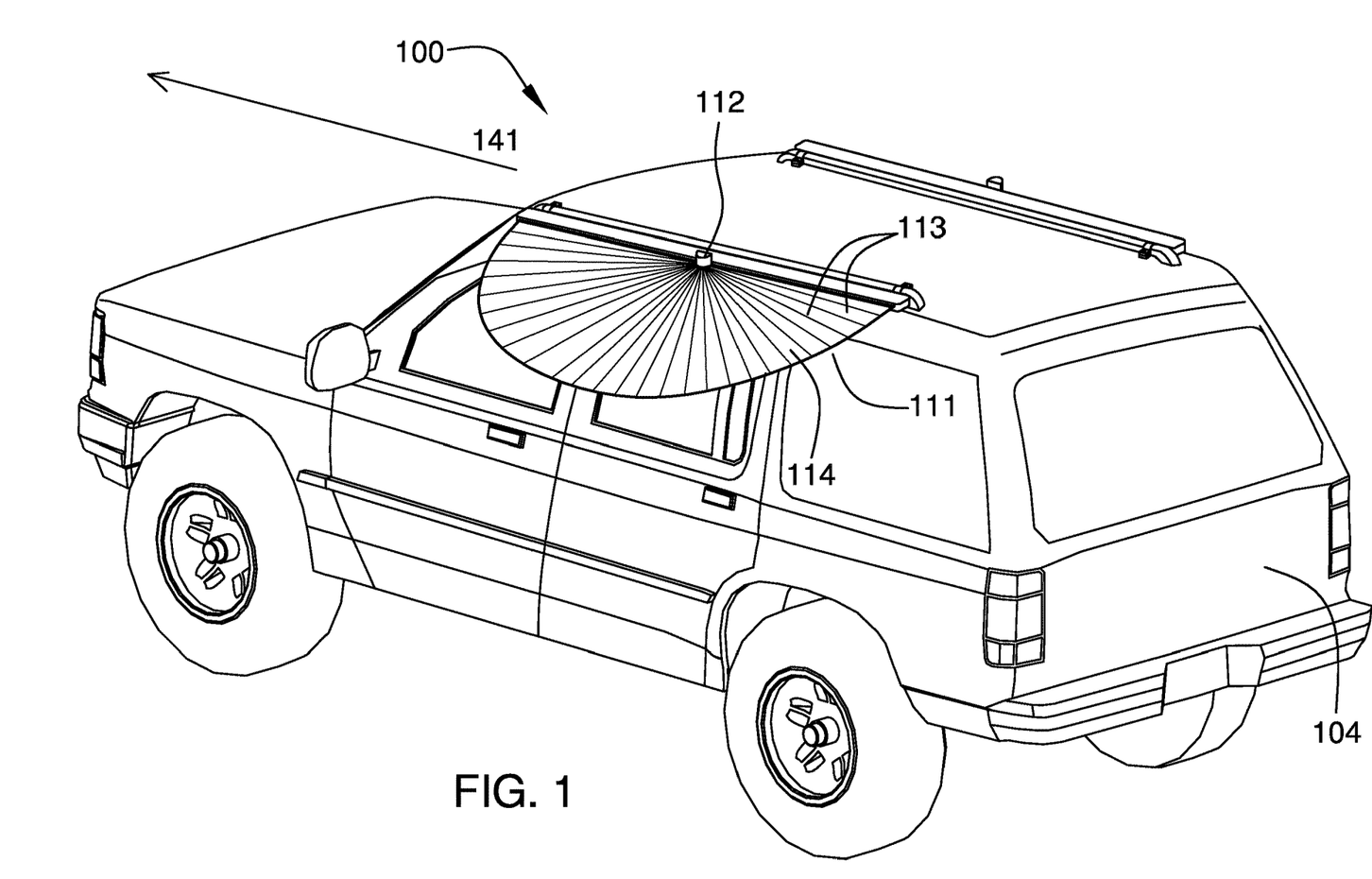
FIG. 1 is a perspective view of an embodiment of the disclosure.
Figure 2:
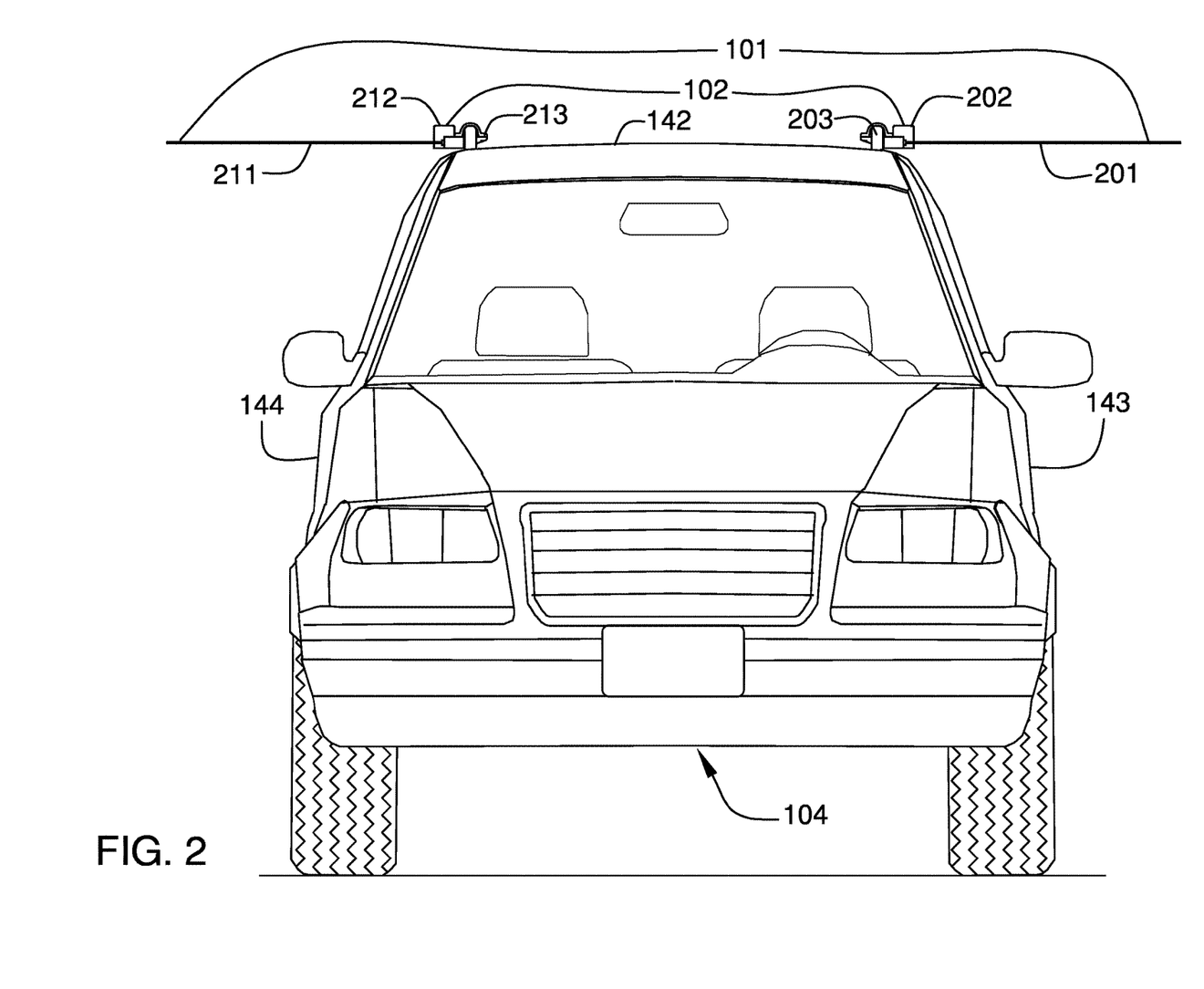
FIG. 2 is a front view of an embodiment of the disclosure.
Figure 3:
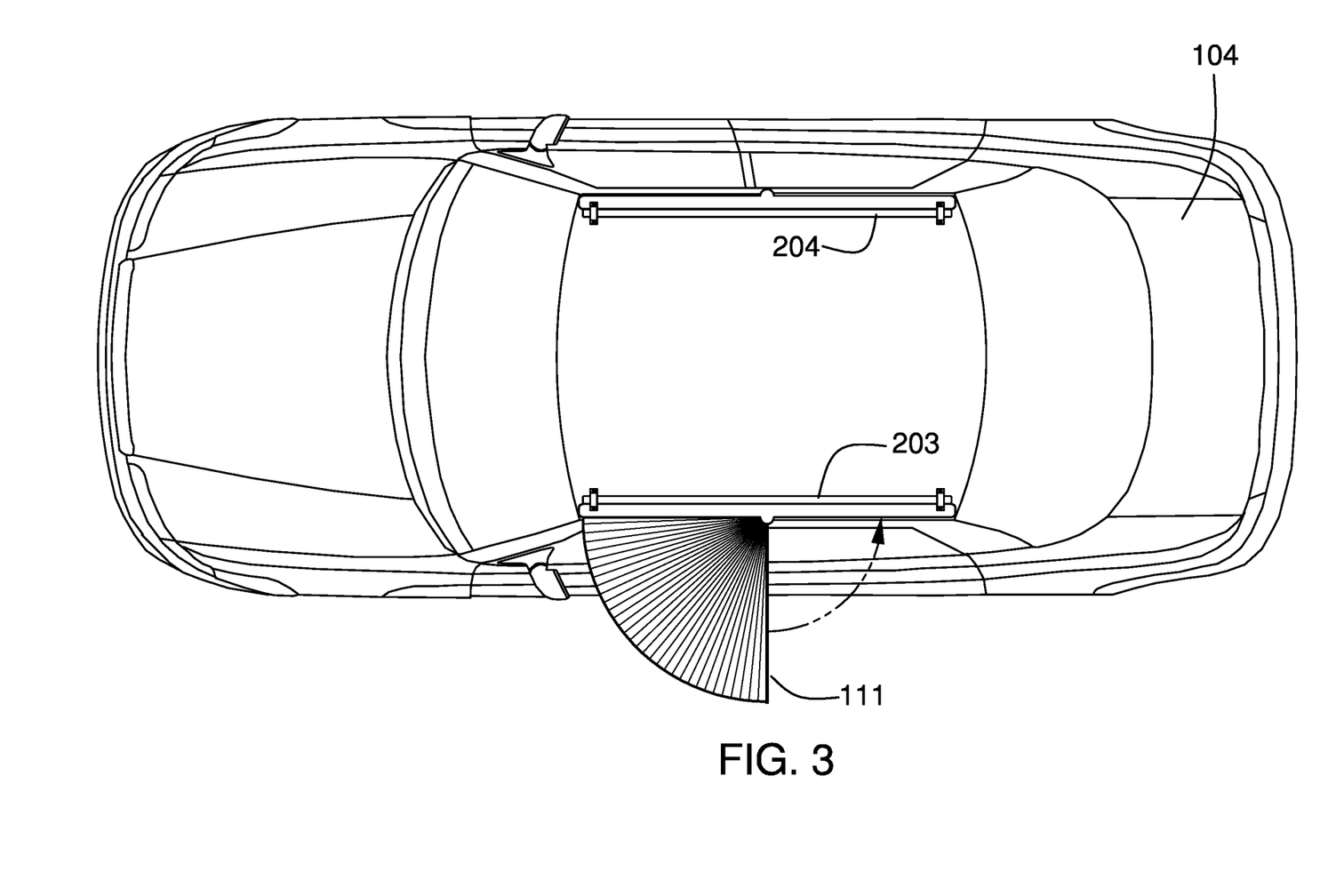
FIG. 3 is a top view of an embodiment of the disclosure.
Figure 4:
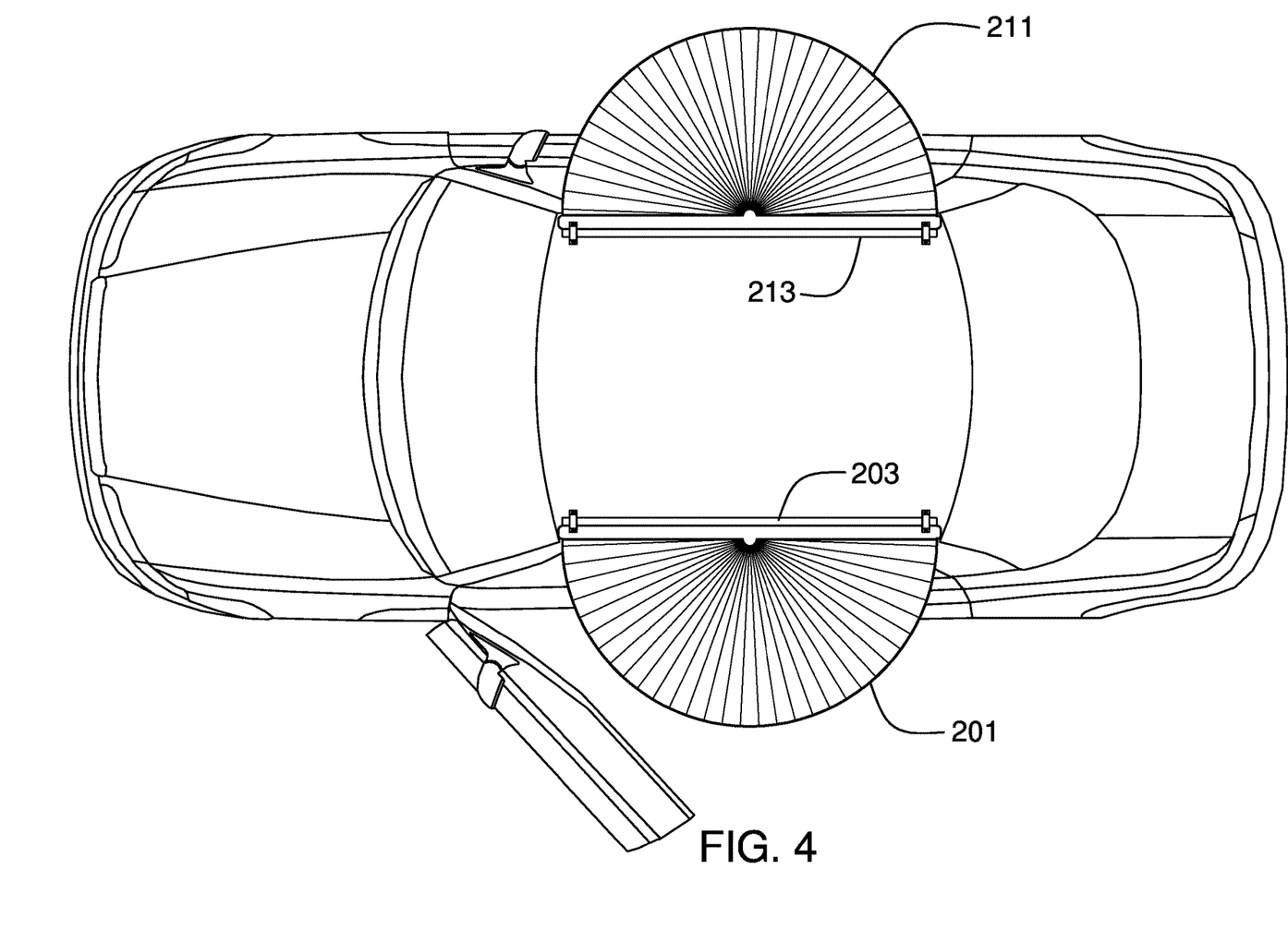
FIG. 4 is a top view of an embodiment of the disclosure.
Figure 5:
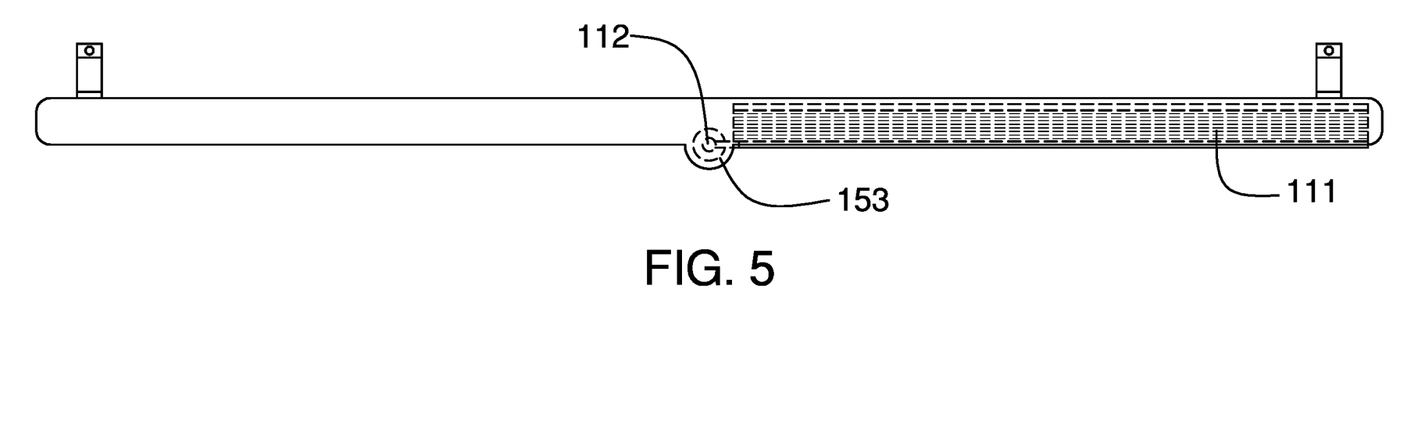
FIG. 5 is a bottom view of an embodiment of the disclosure.
Figure 6:
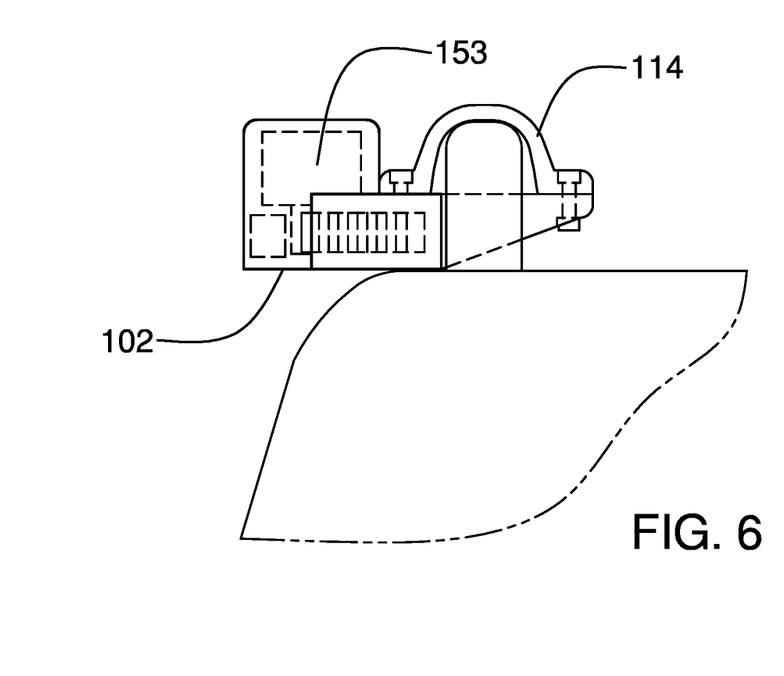
FIG. 6 is a detail view of an embodiment of the disclosure.
Figure 7:
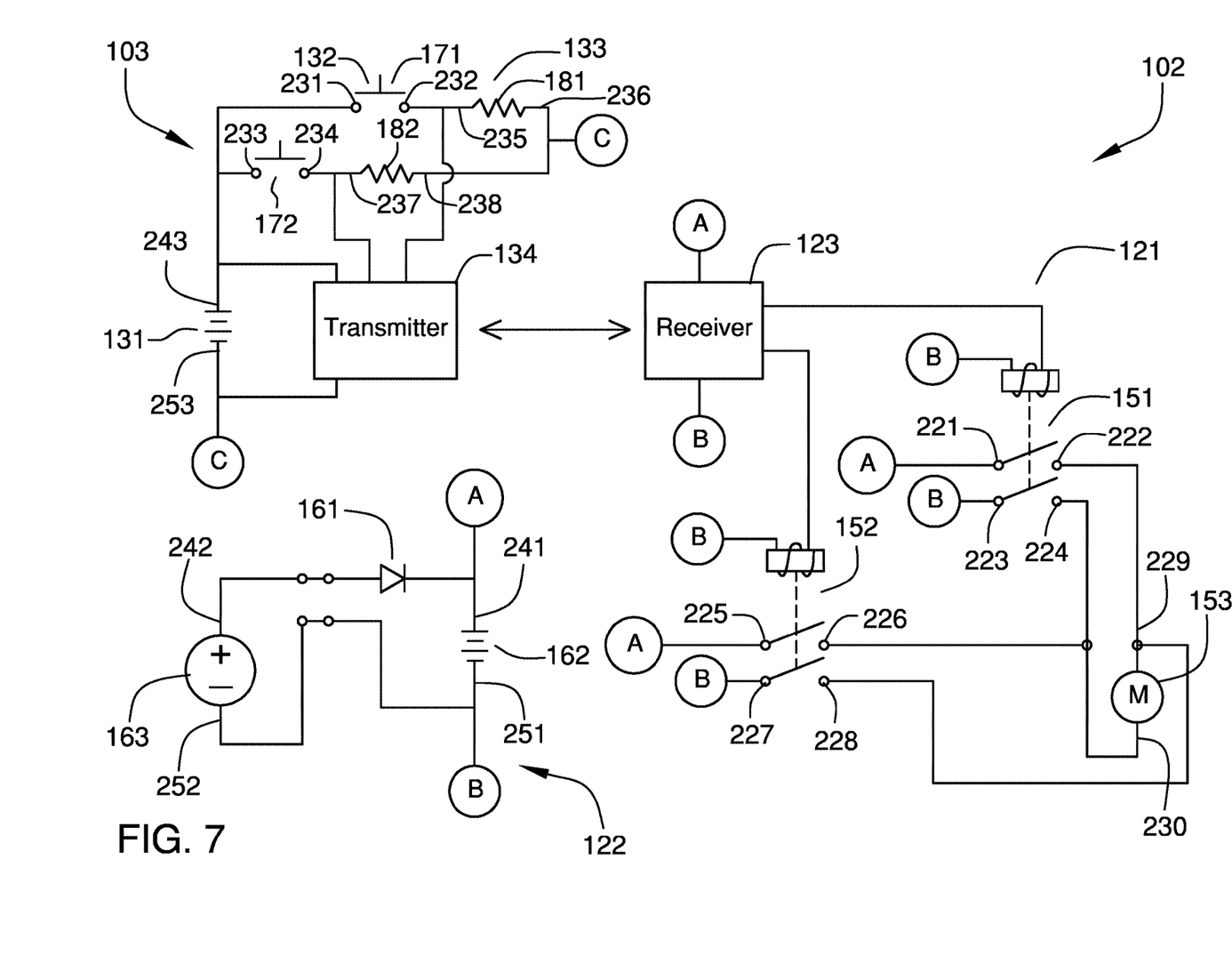
FIG. 7 is a schematic view of an embodiment of the disclosure.

Detailed reference will now be made to one or more potential embodiments of the disclosure, which are illustrated in FIGS. 1 through 7.

The rack mounted weather shield 100 (hereinafter invention) is an awning. The invention 100 is configured for use with an automobile 104. The automobile 104 further comprises a roof panel 142, a port side 143, and a starboard side 144. The automobile 104 is further defined with a primary sense of direction 141. The roof panel 142 further comprises a port cargo rack 203 and a starboard cargo rack 213. The invention 100 attaches to a cargo rack selected from the group consisting of the port cargo rack 203 and the starboard cargo rack 213. The invention 100 creates a weather protected space along a side of the automobile 104 selected from the group consisting of the port side 143 and the starboard side 144. The invention 100 is used for entering and exiting the automobile 104 in inclement weather. The invention 100 extends for use and retracts for storage.

The invention 100 comprises a plurality of fans 101, a plurality of control circuits 102, and a remote control 103. Each of the plurality of fans 101 creates the weather protected space on a side of the automobile 104 selected from the group consisting of the port side 143 and the starboard side 144. Each of the plurality of control circuits 102 extends and retracts an individual fan 111 selected from the plurality of fans 101. The remote control 103 is a radio frequency device that controls the operation of the plurality of control circuits 102.

The primary sense of direction 141 refers to the direction of motion of the automobile 104 that is parallel to the bow-stern axis of the automobile 104. The roof panel 142 refers to the superior surface of the automobile 104. The port side 143 refers to the side of the automobile 104 that is primarily parallel to the primary sense of direction 141 of the automobile 104 and that forms the port boundary of the automobile 104. The starboard side 144 refers to the side of the automobile 104 that is primarily parallel to the primary sense of direction 141 of the automobile 104 and that forms the starboard boundary of the automobile 104. The automobile 104 is defined in greater detail elsewhere in this disclosure.

Each of the plurality of fans 101 are a semicircular folding device. Each of the plurality of fans 101 rotates between an open position and a closed position. Each of the plurality of fans 101 are identical. The plurality of fans 101 mount on the roof panel 142 of the automobile 104. Each of the plurality of fans 101 mounts on a side of the automobile 104 selected from the group consisting of the port side 143 and the starboard side 144.

Each of the plurality of fans 101 forms a horizontal surface located above a side of the automobile 104 selected from the group consisting of the port side 143 and the starboard side 144. The horizontal surface formed by each of the plurality of fans 101 forms a protected space on each side of the automobile 104 selected from the group consisting of the port side 143 and the starboard side 144. The protected space formed by the plurality of fans 101 protects passengers from the weather as they enter and exit the automobile 104. Each of the plurality of fans 101 forms the protected space when in the open position. Each of the plurality of fans 101 is stored in the closed position. The plurality of fans 101 are retracted into the closed position when the automobile 104 is in motion. The plurality of fans 101 comprises a collection of individual fans 111.

Each individual fan 111 comprises a hub 112, a plurality of spokes 113, a sheeting 114, and a mounting bracket 115.

Each individual fan 111 selected from the plurality of fans 101 is identical to the fans remaining in the plurality of fans 101. The individual fan 111 forms the horizontal structure that forms the protected surface on a side of the automobile 104 selected from the group consisting of the port side 143 and the starboard side 144. The individual fan 111 rotates to expand into the open position and retract into the closed position. The individual fan 111 forms a semicircular structure.

The hub 112 is a disk-shaped structure positioned at the center of the circular structure that forms the semicircular structure of the individual fan 111. The hub 112 is a rotating structure that allows the individual fan 111 to expand into the open position and retract into the closed position.

The plurality of spokes 113 attach to the lateral face of the disk structure of the hub 112 such that each of the plurality of spokes 113 project radially away from the center axis of the disk structure of the hub 112 in the manner of a cantilever. The plurality of spokes 113 forms an openwork on which the sheeting 114 attaches. The hub 112 rotates such that the plurality of spokes 113 rotate to increase and decrease the horizontal surface area of the sheeting 114 that is exposed to the weather. When the plurality of spokes 113 are positioned such that the horizontal surface area of the sheeting 114 that is exposed to the weather is at a maximum, the individual fan 111 is in the open position. When the plurality of spokes 113 are positioned such that the horizontal surface area of the sheeting 114 that is exposed to the weather is at a minimum the individual fan 111 is in the closed position.

The sheeting 114 is a flexible material that attaches to the plurality of spokes 113. The sheeting 114 forms a fluid impermeable barrier. The sheeting 114 creates the weather protected space when the individual fan 111 is in the open position. The sheeting 114 attaches to the plurality of spokes 113 such that the horizontal surface area presented by the sheeting 114 varies as the relative position of the hub 112 adjusts the relative positions of the plurality of spokes 113.

Methods to form the individual fan 111 as described above are well-known and documented in the mechanical arts.

The mounting bracket 115 is a hardware item. The mounting bracket 115 attaches an individual fan 111 selected from the plurality of fans 101 to a cargo rack selected from the group consisting of the port cargo rack 203 and the starboard cargo rack 213. Methods to form the mounting bracket 115 as described above are well-known and documented in the mechanical arts.

Each of the plurality of control circuits 102 is an electrical circuit. Each of the plurality of control circuits 102 is identical. Each of the plurality of control circuits 102 mounts on a roof panel 142 of the automobile 104. The plurality of control circuits 102 mounts on a side of the automobile 104 selected from the group consisting of the port side 143 and the starboard side 144. There is a one to one correspondence between the plurality of control circuits 102 and the plurality of fans 101. Each of the plurality of control circuits 102 rotates the corresponding individual fan 111 selected from the plurality of fans 101 between the closed position and the open position. Each of the plurality of control circuits 102 is controlled by the remote control 103. Each of the plurality of control circuits 102 comprises an operating circuit 121, a power circuit 122, and a receiver 123.

The operating circuit 121 is an electrical circuit. The operating circuit 121 is an electromechanical device that physically rotates the hub 112 of the individual fan 111 associated with the operating circuit 121 such that the operating circuit 121 rotates the individual fan 111 between the open position and the closed position. The operating circuit 121 is controlled using the remote control 103. Specifically, the operating circuit 121 receives control signals generated by the remote control 103 through the receiver 123. The receiver 123 is a radio frequency device that receives radio frequency control signals from the remote control 103 and converts the received control signals into electrical signals used to control the operation of the operating circuit 121.

The operating circuit 121 comprises a first relay 151, a second relay 152, and a motor 153. The first relay 151 is further defined with a first lead 221, a second lead 222, a third lead 223, and a fourth lead 224. The second relay 152 is further defined with a fifth lead 225, a sixth lead 226, a seventh lead 227, and an eighth lead 228. The motor 153 is further defined with a ninth lead 229 and a tenth lead 230.

The first relay 151 is an electrical switching device. The first relay 151 acts as a dual pole single throw switch. The dual poles of the first relay 151 actuate in unison. The first relay 151 controls the rotation of the motor 153. The first relay 151 electrically connects to the power circuit 122 and the receiver 123 such that the actuation of the first relay 151 by the receiver 123 causes the motor 153 to rotate the hub 112 from the closed position to the open position.

The second relay 152 is an electrical switching device. The second relay 152 acts as a dual pole single throw switch. The dual poles of the second relay 152 actuate in unison. The second relay 152 controls the rotation of the motor 153. The second relay 152 electrically connects to the power circuit 122 and the receiver 123 such that the actuation of the second relay 152 by the receiver 123 causes the motor 153 to rotate the hub 112 from the open position to the open position.

The first lead 221 and the second lead 222 form the first pole of the first relay 151. The third lead 223 and the fourth lead 224 form the second pole of the first relay 151. The fifth lead 225 and the sixth lead 226 form the first pole of the second relay 152. The seventh lead 227 and the eighth lead 228 form the second pole of the second relay 152.

The motor 153 attaches to the hub 112 such that the motor 153 rotates the hub 112 to extend and retract the associated individual fan 111. The motor 153 is an electric motor. The motor 153, including electrical versions of the motor 153 are defined in greater detail elsewhere in this disclosure.

The power circuit 122 is an electrical circuit. The power circuit 122 provides the electrical power required to operate the operating circuit 121 and the receiver 123. The power circuit 122 draws electrical power from the vehicle electrical power system 163. The power circuit 122 maintains an operating battery 162 such that the plurality of control circuits 102 can operate when the vehicle electrical power system 163 of the automobile 104 is shut down. The power circuit 122 comprises a diode 161, an operating battery 162, and a vehicle electrical power system 163. The operating battery 162 is further defined with a first positive terminal 241 and a first negative terminal 251. The vehicle electrical power system 163 is further defined with a second positive terminal 242 and a second negative terminal 252.

The operating battery 162 is a commercially available rechargeable operating battery 162. The chemical energy stored within the rechargeable operating battery 162 is renewed and restored through the use of the vehicle electrical power system 163. The vehicle electrical power system 163 is an electrical circuit that reverses the polarity of the rechargeable operating battery 162 and provides the energy necessary to reverse the chemical processes that the rechargeable operating battery 162 initially used to generate the electrical energy. This reversal of the chemical process creates a chemical potential energy that will later be used by the rechargeable operating battery 162 to generate electricity.

The diode 161 is an electrical device that allows current to flow in only one direction. The diode 161 installs between the rechargeable operating battery 162 and the vehicle electrical power system 163 such that electricity will not flow from the first positive terminal 241 of the rechargeable operating battery 162 into the second positive terminal 242 of the vehicle electrical power system 163.

The remote control 103 is an electrical circuit. The remote control 103 is a hand-carried device. The remote control 103 is a radio frequency device. The remote control 103 wirelessly controls the operation of the plurality of control circuits 102. The remote control 103 transmits a radio frequency signal that causes each of the plurality of control circuits 102 to simultaneously rotate each of the plurality of fans 101 to the open position. The remote control 103 transmits a radio frequency signal that causes each of the plurality of control circuits 102 to simultaneously rotate each of the plurality of fans 101 to the closed position. The remote control 103 comprises a transmitting battery 131, a plurality of momentary switches 132, a plurality of limit resistors 133, and a transmitter 134. The transmitting battery 131 is further defined with a third positive terminal 243 and a third negative terminal 253.

The transmitting battery 131 is an electrochemical device that converts chemical potential energy into electrical energy. The transmitting battery 131 powers the operation of the plurality of momentary switches 132, the plurality of limit resistors 133, and the transmitter 134.

Each of the plurality of momentary switches 132 is a momentary electric switch. Each of the plurality of momentary switches 132 electrically connects in a series circuit with a limit resistor selected from the plurality of limit resistors 133. Each of the plurality of momentary switches 132 is monitored by the transmitter 134. Each of the plurality of momentary switches 132 generates a signal that indicates to the transmitter 134 the desired direction of rotation of the hub 112 that will be transmitted to the receiver 123 of each of the plurality of control circuits 102. The plurality of momentary switches 132 comprises a first momentary switch 171 and a second momentary switch 172. The first momentary switch 171 is further defined with an eleventh lead 231 and a twelfth lead 232. The second momentary switch 172 is further defined with a thirteenth lead 233 and a fourteenth lead 234.

The first momentary switch 171 is a momentary switch selected from the plurality of momentary switches 132. The actuation of the first momentary switch 171 instructs the transmitter 134 to send a signal to the receiver 123 that directs the operating circuit 121 to rotate the individual fan 111 from the closed position to the open position.

The second momentary switch 172 is a momentary switch selected from the plurality of momentary switches 132. The actuation of the second momentary switch 172 instructs the transmitter 134 to send a signal to the receiver 123 that directs the operating circuit 121 to rotate the individual fan 111 from the open position to the closed position.

Each of the plurality of limit resistors 133 is an electric circuit element. Each of the plurality of limit resistors 133 presents a voltage to the transmitter 134. The voltage presented by any limit resistor selected from the plurality of limit resistors 133 indicates to the transmitter 134 the specific control signal that is to be sent to the receiver 123 of each of the plurality of control circuits 102. The plurality of limit resistors 133 comprises a first limit resistor 181 and a second limit resistor 182. The first limit resistor 181 is further defined with a fifteenth lead 235 and a sixteenth lead 236. The second limit resistor 182 is further defined with a seventeenth lead 237 and an eighteenth lead 238.

The first limit resistor 181 is a resistor selected from the plurality of limit resistors 133. The first limit resistor 181 electrically connects in series with the first momentary switch 171. The first limit resistor 181 presents a voltage to the transmitter 134 when the first momentary switch 171 is actuated to the closed position that initiates a transmission to the receiver 123.

The second limit resistor 182 is a resistor selected from the plurality of limit resistors 133. The second limit resistor 182 electrically connects in series with the second momentary switch 172. The second limit resistor 182 presents a voltage to the transmitter 134 when the second momentary switch 172 is actuated to the closed position that initiates a transmission to the receiver 123.

The transmitter 134 is an electrical device that generates electromagnetic radiation that is received by the receiver 123. In the first potential embodiment of the disclosure, a commercially available 433 MHz remote control switch and transmitter kit is used as the transmitter 134, the receiver 123, and a significant proportion of the operating circuit 121. The control signal generated by the transmitter 134 is selected from the group consisting of a) rotating the hub 112 such that the individual fan 111 rotates from a closed position to an open position; and, b) rotating the hub 112 such that the individual fan 111 rotates from the open position to the closed position.

The following two paragraphs describe the assembly of each of the operating circuit 121.

The operating battery 162 provides the electrical power required to operate the receiver 123. The receiver 123 controls the operation of the coil of the first relay 151. The receiver 123 controls the operation of the coil of the second relay 152.

The first lead 221 of the first relay 151 electrically connects to the first positive terminal 241 of the operating battery 162. The third lead 223 of the first relay 151 electrically connects to the first negative terminal 251 of the operating battery 162. The fifth lead 225 of the second relay 152 electrically connects to the first positive terminal 241 of the operating battery 162. The seventh lead 227 of the second relay 152 electrically connects to the first negative terminal 251 of the operating battery 162.

The second lead 222 of the first relay 151 electrically connects to the ninth lead 229 of the motor 153. The fourth lead 224 of the first relay 151 electrically connects to the tenth lead 230 of the motor 153. The sixth lead 226 of the second relay 152 electrically connects to the tenth lead 230 of the motor 153. The eighth lead 228 of the second relay 152 electrically connects to the ninth lead 229 of the motor 153.

The following three paragraphs describe the assembly and operation of the remote control 103.

The transmitting battery 131 provides the electrical power required to operate the transmitter 134. The eleventh lead 231 of the first momentary switch 171 electrically connects to the third positive terminal 243 of the transmitting battery 131. The twelfth lead 232 of the first momentary switch 171 electrically connects to the fifteenth lead 235 of the first limit resistor 181. The sixteenth lead 236 of the first limit resistor 181 electrically connects to the third negative terminal 253 of the transmitting battery 131. The thirteenth lead 233 of the second momentary switch 172 electrically connects to the third positive terminal 243 of the transmitting battery 131. The fourteenth lead 234 of the second momentary switch 172 electrically connects to the seventeenth lead 237 of the second limit resistor 182. The eighteenth lead 238 of the second limit resistor 182 electrically connects to the third negative terminal 253 of the transmitting battery 131.

When the transmitter 134 detects a voltage at the fifteenth lead 235 of the first limit resistor 181 the transmitter 134 transmits a signal to the receiver 123 that causes the receiver 123 to energize the coil of the first relay 151. When the transmitter 134 does not detect a voltage at the fifteenth lead 235 of the first limit resistor 181 the transmitter 134 discontinues the signal to the receiver 123 which causes the receiver 123 to de-energize the coil of the first relay 151.

When the transmitter 134 detects a voltage at the seventeenth lead 237 of the second limit resistor 182 the transmitter 134 transmits a signal to the receiver 123 that causes the receiver 123 to energize the coil of the second relay 152. When the transmitter 134 does not detect a voltage at the seventeenth lead 237 of the second limit resistor 182 the transmitter 134 discontinues the signal to the receiver 123 which causes the receiver 123 to de-energize the coil of the second relay 152.

In the first potential embodiment of the disclosure, the plurality of fans 101 further comprises a port fan 201 and a starboard fan 211. The plurality of control circuits 102 further comprises a port control circuit 202 and a starboard control circuit 212.

The port fan 201 is the individual fan 111 selected from the plurality of fans 101 that forms the weather protected space along the port side 143 of the automobile 104. The port fan 201 attaches to the port cargo rack 203 of the automobile 104. The port control circuit 202 is the control circuit selected from the plurality of control circuits 102 that controls the opening and the closing of the port fan 201. The port control circuit 202 is operated using the remote control 103. The port control circuit 202 attaches to the hub 112 of the port fan 201. The port cargo rack 203 is a mechanical structure that attaches to the superior surface of the roof panel 142 of the automobile 104. The port cargo rack 203 forms an anchor point to which the port fan 201 is anchored.

The starboard fan 211 is the individual fan 111 selected from the plurality of fans 101 that forms the weather protected space along the starboard side 144 of the automobile 104. The starboard fan 211 attaches to the starboard cargo rack 213 of the automobile 104. The starboard control circuit 212 is the control circuit selected from the plurality of control circuits 102 that controls the opening and the closing of the starboard fan 211. The starboard control circuit 212 is operated using the remote control 103. The starboard control circuit 212 attaches to the hub 112 of the starboard fan 211. The starboard cargo rack 213 is a mechanical structure that attaches to the superior surface of the roof panel 142 of the automobile 104. The starboard cargo rack 213 forms an anchor point to which the starboard fan 211 is anchored. The starboard cargo rack 213 is identical to the port cargo rack 203.

The starboard cargo rack 213 is identical the port cargo rack 203. The starboard cargo rack 213 is parallel to the port cargo rack 203. The starboard cargo rack 213 is to the starboard of the port cargo rack 203

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anchor: As used in this disclosure, anchor means to hold an object firmly or securely.

Anchor Point: As used in this disclosure, an anchor point is a location to which a first object can be securely attached to a second object.

Anterior: As used in this disclosure, the anterior is a term that is used to refer to the front side or direction of a structure. When comparing two objects, the anterior object is the object that is closer to the front of the structure.

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile is further defined with a hood panel and a roof panel. The automobile is often defined with a trunk panel.

Awning: As used in this disclosure, an awning is an overhanging structure that protects a door or a window from the weather. The valence of an awning is the vertical portion of the protective cover of the awning.

Battery: As used in this disclosure, a battery is a chemical device consisting of one or more cells, in which chemical energy is converted into electricity and used as a source of power. Batteries are commonly defined with a positive terminal and a negative terminal.

Bow: As used in this disclosure, the bow refers to the anterior side of an object, vehicle, or vessel. Specifically, the bow refers to the most forward element of the object in the direction of the primary sense of direction of the object, vehicle, or vessel.

Bracket: As used in this disclosure, a bracket is a mechanical structure that attaches a second structure to a first structure such that the load path of the second structure is fully transferred to the first structure.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Closed Position: As used in this disclosure, a closed position refers to a movable barrier structure that is in an orientation that prevents passage through a port or an aperture. The closed position is often referred to as an object being "closed." Always use orientation.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the ends of the prism-shaped structure that forms the disk are referred to as the faces of the disk.

Door: As used in this disclosure, a door is a movable or removable barrier that is attached to a chamber for the purpose of allowing or preventing access through an aperture into the chamber.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interaction between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hub: As used in this disclosure, a hub is a disk-shaped structure that forms the center point of a rotating object.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Motor: As used in this disclosure, a motor refers to the method of transferring energy from an external power source into rotational mechanical energy.

Mount: As used in this disclosure, a mount is a mechanical structure that attaches or incorporates a first object to a second object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Openwork: As used in this disclosure, the term open work is used to describe a structure, often a surface, which is formed with openings that allow for visibility and fluid flow through the structure. Wrought work and meshes are forms of openwork.

Orientation: As used in this disclosure, orientation refers to the positioning of a first object relative to: 1) a second object; or, 2) a fixed position, location, or direction.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Radial: As used in this disclosure, the term radial refers to a direction that: 1) is perpendicular to an identified central axis; or, 2) projects away from a center point.

Receiver: As used in this disclosure, a receiver is a device that is used to receive and demodulate electromagnetic radiation such as radio signals.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Remote Control: As used in this disclosure, remote control means the establishment of control of a device from a distance. Remote control is generally accomplished through the use of an electrical device that generates electrically based control signals that are transmitted via radio frequencies or other means to the device.

Sheeting: As used in this disclosure, a sheeting is a material, such as a paper, textile, a plastic, or a metal foil, in the form of a thin flexible layer or layers.

Spoke: As used in this disclosure, a spoke refers to one of a plurality of prism-shaped shaft structures that project radially away from a center point of a central hub. Spokes are often rotated around the center point by the rotation of the central hub.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Transmitter: As used in this disclosure, a transmitter is a device that is used to generate and transmit electromagnetic radiation such as radio signals.

Transistor: As used in this disclosure, a transistor is a general term for a three-terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation. The transistors used in this disclosure operate in either an amplifier mode or a switch mode. In the amplifier mode, when a first current flows into the base, a second current flows from the collector to the emitter. The amount of the second current is a linear function of the first current. In this mode, the transistor acts as an amplifier. The operation of a transistor moves to a switching mode when the first current reaches the saturation levels of the transistor. In the switch mode, when a voltage is applied to the base, current will flow into the base and the transistor will act like a closed switch allowing current to flow from the collector to the emitter. When the voltage is removed from the base, the transistor will act like an open switch disrupting current flow from the collector to the emitter.

Vehicle: As used in this disclosure, a vehicle is a device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Weather: As used in this disclosure, the term weather refers to a collection of measurable parameters of the atmosphere including, but not limited to, temperature, humidity, precipitation, air movement caused by wind and energy and illumination from the sun. A structure that isolates an individual or object from the more uncomfortable or destructive aspects of the weather is said to protect against the weather. The term elements is often used to refer to weather.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A weather barrier for an automobile comprising:
    a plurality of fans, a plurality of control circuits, and a remote control;
    wherein each of the plurality of control circuits extends and retracts an individual fan selected from the plurality of fans;
    wherein the remote control is a radio frequency device that controls the operation of the plurality of control circuits;
    wherein the weather barrier for an automobile is an awning;
    wherein the weather barrier for an automobile is configured for use with an automobile;
    wherein the weather barrier for an automobile is used for entering and exiting the automobile in inclement weather;
    wherein the weather barrier for an automobile creates a weather protected space beside the automobile;
    wherein the weather barrier for an automobile extends for use and retracts for storage;
    wherein each of the plurality of fans is a semicircular folding device;
    wherein each of the plurality of fans rotates between an open position and a closed position;
    wherein each of the plurality of fans is identical;
    wherein each of the plurality of fans mounts on a side of the automobile selected from the group consisting of a port side and a starboard side;
    wherein the plurality of fans comprises a collection of individual fans;
    wherein each individual fan comprises a hub, a plurality of spokes, a sheeting, and a mounting bracket;
    wherein the sheeting attaches to the plurality of spokes;
    wherein the plurality of spokes attach to the hub;
    wherein the mounting bracket attaches the hub to a cargo rack selected from the group consisting of the port cargo rack and the starboard cargo rack;
    wherein each of the plurality of control circuits comprises an operating circuit, a power circuit, and a receiver;
    wherein each of the operating circuit, the power circuit, and the receiver are electrically interconnected.

2. The weather barrier for an automobile according to claim 1 wherein the automobile further comprises a roof panel, and a vehicle electrical power system;
    wherein the automobile is further defined with a primary sense of direction;
    wherein the primary sense of direction refers to the direction of motion of the automobile;
    wherein the roof panel refers to the superior surface of the automobile;
    wherein the port side refers to the side of the automobile that is primarily parallel to the primary sense of direction of the automobile and that forms the port boundary of the automobile;
    wherein the starboard side refers to the side of the automobile that is primarily parallel to the primary sense of direction of the automobile and that forms the starboard boundary of the automobile;
    wherein the roof panel further comprises a port cargo rack and a starboard cargo rack;
    wherein the vehicle electrical power system is a source of electrical energy.

3. The weather barrier for an automobile according to claim 2
    wherein the each of the plurality of fans attaches to a cargo rack selected from the group consisting of the port cargo rack and the starboard cargo rack;
    wherein each of the plurality of fans forms a horizontal surface located above a side of the automobile selected from the group consisting of the port side and the starboard side;
    wherein the horizontal surface formed by each of the plurality of fans forms a protected space on each side of the automobile selected from the group consisting of the port side and the starboard side;
    wherein each of the plurality of fans forms the protected space when in the open position;
    wherein each of the plurality of fans is stored in the closed position.

4. The weather barrier for an automobile according to claim 3
    wherein each of the plurality of control circuits is an electrical circuit;
    wherein each of the plurality of control circuits is identical;
    wherein each of the plurality of control circuits mounts on a roof panel of the automobile;
    wherein the plurality of control circuits mounts on a side of the automobile selected from the group consisting of the port side and the starboard side;
    wherein there is a one to one correspondence between the plurality of control circuits and the plurality of fans;
    wherein each of the plurality of control circuits rotates the corresponding individual fan selected from the plurality of fans between the closed position and the open position;
    wherein each of the plurality of control circuits is controlled by the remote control.

5. The weather barrier for an automobile according to claim 4
    wherein the remote control is an electrical circuit;
    wherein the remote control is a hand-carried device;
    wherein the remote control is a radio frequency device;
    wherein the remote control wirelessly controls the operation of the plurality of control circuits;
    wherein the remote control transmits a radio frequency signal that causes each of the plurality of control circuits to simultaneously rotate each of the plurality of fans to the open position;
    wherein the remote control transmits a radio frequency signal that causes each of the plurality of control circuits to simultaneously rotate each of the plurality of fans to the closed position.

6. The weather barrier for an automobile according to claim 5 wherein each individual fan selected from the plurality of fans is identical to the fans remaining in the plurality of fans;

wherein the individual fan forms the horizontal structure that forms the protected surface on a side of the automobile selected from the group consisting of the port side and the starboard side;

wherein the individual fan rotates to expand into the open position and retract into the closed position;

wherein the individual fan forms a semicircular structure;

wherein the sheeting is a flexible material that attaches to the plurality of spokes;

wherein the sheeting forms a fluid impermeable barrier;

wherein the hub is a disk-shaped structure positioned at the center of a circular structure that forms the semicircular structure of the individual fan;

wherein the hub is a rotating structure that allows the individual fan to expand into the open position and retract into the closed position;

wherein the plurality of spokes attach to the lateral face of the disk structure of the hub such that each of the plurality of spokes project radially away from the center axis of the disk structure of the hub in the manner of a cantilever;

wherein the plurality of spokes forms an openwork;

wherein the sheeting attaches to the plurality of spokes;

wherein the hub rotates such that the plurality of spokes rotate to increase and decrease the horizontal surface area of the sheeting that is exposed to the weather;

wherein when the plurality of spokes are positioned such that the horizontal surface area of the sheeting that is exposed to the weather is at a maximum, the individual fan is in the open position;

wherein when the plurality of spokes are positioned such that the horizontal surface area of the sheeting that is exposed to the weather is at a minimum the individual fan is in the closed position;

wherein the sheeting attaches to the plurality of spokes such that the horizontal surface area presented by the sheeting varies as the relative position of the hub adjusts the relative positions of the plurality of spokes;

wherein the mounting bracket is a hardware item;

wherein the mounting bracket attaches an individual fan selected from the plurality of fans to a cargo rack selected from the group consisting of the port cargo rack and the starboard cargo rack.

7. The weather barrier for an automobile according to claim 6 wherein the operating circuit is an electrical circuit;

wherein the receiver is a radio frequency device that receives radio frequency control signals from the remote control and converts the received control signals into electrical signals used to control the operation of the operating circuit;

wherein the operating circuit is an electromechanical device that physically rotates the hub of the individual fan associated with the operating circuit such that the operating circuit rotates the individual fan between the open position and the closed position.

8. The weather barrier for an automobile according to claim 7 wherein the power circuit is an electrical circuit;

wherein the power circuit provides the electrical power required to operate the operating circuit and the receiver;

wherein the power circuit draws electrical power from the vehicle electrical power system;

wherein the power circuit can operate when the vehicle electrical power system of the automobile is shut down.

9. The weather barrier for an automobile according to claim 8 wherein the operating circuit comprises a first relay, a second relay, and a motor;

wherein the first relay, the second relay, and the motor are electrically interconnected;

wherein the first relay is further defined with a first lead, a second lead, a third lead, and a fourth lead;

wherein the second relay is further defined with a fifth lead, a sixth lead, a seventh lead, and an eighth lead;

wherein the motor is further defined with a ninth lead and a tenth lead.

10. The weather barrier for an automobile according to claim 9 wherein the power circuit comprises a diode, an operating battery, and the vehicle electrical power system;

wherein the diode, the operating battery, and the vehicle electrical power system are electrically interconnected;

wherein the operating battery is further defined with a first positive terminal and a first negative terminal;

wherein the vehicle electrical power system is further defined with a second positive terminal and a second negative terminal.

11. The weather barrier for an automobile according to claim 10 wherein the remote control comprises a transmitting battery, a plurality of momentary switches, a plurality of limit resistors, and a transmitter;

wherein the transmitting battery, the plurality of momentary switches, the plurality of limit resistors, and the transmitter are electrically interconnected;

wherein the transmitting battery is further defined with a third positive terminal and a third negative terminal.

12. The weather barrier for an automobile according to claim 11 wherein the first relay is an electrical switching device;

wherein the first relay forms a dual pole single throw switch;

wherein the first relay electrically connects to the power circuit and the receiver such that the actuation of the first relay by the receiver causes the motor to rotate the hub from the closed position to the open position;

wherein the second relay is an electrical switching device;

wherein the second relay forms a dual pole single throw switch;

wherein the second relay electrically connects to the power circuit and the receiver such that the actuation of the second relay by the receiver causes the motor to rotate the hub from the closed position to the open position;

wherein the first lead and the second lead form the first pole of the first relay;

wherein the third lead and the fourth lead form the second pole of the first relay;

wherein the fifth lead and the sixth lead form the first pole of the second relay;

wherein the seventh lead and the eighth lead form the second pole of the second relay;

wherein the motor is an electric motor;

wherein the motor attaches to the hub such that the motor rotates the hub to extend and retract the associated individual fan.

13. The weather barrier for an automobile according to claim 12
wherein the operating battery is rechargeable;
wherein the vehicle electrical power system is an electrical circuit that reverses the polarity of the rechargeable operating battery;
wherein the diode is an electrical device that allows current to flow in only one direction;
wherein the diode installs between the rechargeable operating battery and the vehicle electrical power system such that electricity will not flow from the first positive terminal of the rechargeable operating battery into the second positive terminal of the vehicle electrical power system.

14. The weather barrier for an automobile according to claim 13
wherein the transmitting battery is an electrochemical device that converts chemical potential energy into electrical energy;
wherein the transmitting battery powers the operation of the plurality of momentary switches, the plurality of limit resistors, and the transmitter;
wherein each of the plurality of momentary switches is a momentary electric switch;
wherein each of the plurality of momentary switches electrically connects in a series circuit with a limit resistor selected from the plurality of limit resistors;
wherein each of the plurality of momentary switches is monitored by the transmitter;
wherein each of the plurality of momentary switches generates a signal that indicates to the transmitter the desired direction of rotation of the hub to be transmitted to the receiver of each of the plurality of control circuits;
wherein the plurality of momentary switches comprises a first momentary switch and a second momentary switch;
wherein the first momentary switch is further defined with an eleventh lead and a twelfth lead;
wherein the second momentary switch is further defined with a thirteenth lead and a fourteenth lead;
wherein the first momentary switch is a momentary switch selected from the plurality of momentary switches;
wherein the actuation of the first momentary switch instructs the transmitter to send a signal to the receiver that directs the operating circuit to rotate the individual fan from the closed position to the open position;
wherein the second momentary switch is a momentary switch selected from the plurality of momentary switches;
wherein the actuation of the second momentary switch instructs the transmitter to send a signal to the receiver that directs the operating circuit to rotate the individual fan from the open position to the closed position;
wherein each of the plurality of limit resistors is an electric circuit element;
wherein each of the plurality of limit resistors presents a voltage to the transmitter;
wherein the voltage presented by any limit resistor selected from the plurality of limit resistors indicates to the transmitter the specific control signal to be transmitted to the receiver of each of the plurality of control circuits;
wherein the plurality of limit resistors comprises a first limit resistor and a second limit resistor;
wherein the first limit resistor is further defined with a fifteenth lead and a sixteenth lead;
wherein the second limit resistor is further defined with a seventeenth lead and an eighteenth lead;
wherein the first limit resistor is a resistor selected from the plurality of limit resistors;
wherein the first limit resistor electrically connects in series with the first momentary switch;
wherein the first limit resistor presents a voltage to the transmitter when the first momentary switch is actuated to the closed position that initiates a transmission to the receiver;
wherein the second limit resistor is a resistor selected from the plurality of limit resistors;
wherein the second limit resistor electrically connects in series with the second momentary switch;
wherein the second limit resistor presents a voltage to the transmitter when the second momentary switch is actuated to the closed position that initiates a transmission to the receiver.

15. The weather barrier for an automobile according to claim 14
wherein the transmitter is an electrical device that generates electromagnetic radiation that is received by the receiver;
wherein the control signal generated by the transmitter is selected from the group consisting of a) rotating the hub such that the individual fan rotates from a closed position to an open position; and, b) rotating the hub such that the individual fan rotates from the open position to the closed position.

16. The weather barrier for an automobile according to claim 15
wherein the operating battery provides the electrical power required to operate the receiver;
wherein the receiver controls the operation of the coil of the first relay;
wherein the receiver controls the operation of the coil of the second relay;
wherein the first lead of the first relay electrically connects to the first positive terminal of the operating battery;
wherein the third lead of the first relay electrically connects to the first negative terminal of the operating battery;
wherein the fifth lead of the second relay electrically connects to the first positive terminal of the operating battery;
wherein the seventh lead of the second relay electrically connects to the first negative terminal of the operating battery;
wherein the second lead of the first relay electrically connects to the ninth lead of the motor;
wherein the fourth lead of the first relay electrically connects to the tenth lead of the motor;
wherein the sixth lead of the second relay electrically connects to the tenth lead of the motor;
wherein the eighth lead of the second relay electrically connects to the ninth lead of the motor.

17. The weather barrier for an automobile according to claim 16
wherein the transmitting battery provides the electrical power required to operate the transmitter;

wherein the eleventh lead of the first momentary switch electrically connects to the third positive terminal of the transmitting battery;

wherein the twelfth lead of the first momentary switch electrically connects to the fifteenth lead of the first limit resistor;

wherein the sixteenth lead of the first limit resistor electrically connects to the third negative terminal of the transmitting battery;

wherein the thirteenth lead of the second momentary switch electrically connects to the third positive terminal of the transmitting battery;

wherein the fourteenth lead of the second momentary switch electrically connects to the seventeenth lead of the second limit resistor;

wherein the eighteenth lead of the second limit resistor electrically connects to the third negative terminal of the transmitting battery.

18. The weather barrier for an automobile according to claim 17 wherein the plurality of fans further comprises a port fan and a starboard fan;

wherein the plurality of control circuits further comprises a port control circuit and a starboard control circuit;

wherein the port fan is the individual fan selected from the plurality of fans that forms the weather protected space along the port side of the automobile;

wherein the port fan attaches to the port cargo rack of the automobile;

wherein the port control circuit is the control circuit selected from the plurality of control circuits that controls the opening and the closing of the port fan;

wherein the port control circuit is operated using the remote control;

wherein the port control circuit attaches to the hub of the port fan;

wherein the port cargo rack is a mechanical structure that attaches to the superior surface of the roof panel of the automobile;

wherein the port cargo rack forms an anchor point to which the port fan is anchored.

19. The weather barrier for an automobile according to claim 18 wherein the plurality of fans further comprises the starboard fan;

wherein the starboard fan is the individual fan selected from the plurality of fans that forms the weather protected space along the starboard side of the automobile;

wherein the starboard fan attaches to the starboard cargo rack of the automobile;

wherein the starboard control circuit is the control circuit selected from the plurality of control circuits that controls the opening and the closing of the starboard fan;

wherein the starboard control circuit is operated using the remote control;

wherein the starboard control circuit attaches to the hub of the starboard fan;

wherein the starboard cargo rack is a mechanical structure that attaches to the superior surface of the roof panel of the automobile;

wherein the starboard cargo rack forms an anchor point to which the starboard fan is anchored;

wherein the starboard cargo rack is identical to the port cargo rack;

wherein the starboard cargo rack is parallel to the port cargo rack;

wherein the starboard cargo rack is to the starboard of the port cargo rack.

* * * * *